(12) United States Patent
Baudouin

(10) Patent No.: US 7,296,848 B2
(45) Date of Patent: Nov. 20, 2007

(54) DASHBOARD CROSS-MEMBER

(75) Inventor: Ivan Baudouin, Aulnay-sous-bois (FR)

(73) Assignee: Faurecia Interieur Industrie, Nanterre (FR)

( * ) Notice: Subject to any disclaimer, the term of this patent is extended or adjusted under 35 U.S.C. 154(b) by 56 days.

(21) Appl. No.: 11/158,626

(22) Filed: Jun. 22, 2005

(65) Prior Publication Data

US 2005/0285433 A1    Dec. 29, 2005

(30) Foreign Application Priority Data

Jun. 25, 2004  (FR) ................... 04 07023

(51) Int. Cl.
*B60K 37/02* (2006.01)
(52) U.S. Cl. .................................... 296/208
(58) Field of Classification Search ................ 296/208, 296/187.01, 187.03
See application file for complete search history.

(56) References Cited

U.S. PATENT DOCUMENTS

| | | | |
|---|---|---|---|
| 6,422,633 B2 | 7/2002 | Neuss et al. | |
| 6,502,897 B2 * | 1/2003 | Neuss et al. | 296/208 |
| 6,705,672 B2 * | 3/2004 | Shikata et al. | 296/208 |
| 6,715,954 B2 * | 4/2004 | Mainka et al. | 403/270 |
| 2001/0043835 A1 | 11/2001 | Mainka et al. | |
| 2002/0030386 A1 * | 3/2002 | Neuss et al. | 296/208 |
| 2002/0145309 A1 | 10/2002 | Shikata et al. | |
| 2002/0153750 A1 * | 10/2002 | Feith et al. | 296/208 |
| 2003/0122403 A1 * | 7/2003 | Brancheriau | 296/208 |
| 2003/0122404 A1 * | 7/2003 | Duchez | 296/208 |
| 2004/0090088 A1 | 5/2004 | Reed et al. | |
| 2005/0017543 A1 * | 1/2005 | Riley et al. | 296/187.03 |

FOREIGN PATENT DOCUMENTS

| | | |
|---|---|---|
| DE | 299 16 470 U1 | 1/2000 |
| DE | 100 46 120 A1 | 4/2001 |
| DE | 102 32 390 A1 | 2/2004 |
| EP | 1 298 035 A1 | 9/2002 |
| JP | 62099206 | 5/1987 |

* cited by examiner

*Primary Examiner*—H Gutman
(74) *Attorney, Agent, or Firm*—Lowrie, Lando & Anastasi, LLP

(57) ABSTRACT

The invention relates to a dashboard cross-member for a motor vehicle, the cross-member comprising a tubular metal structural element assembled to the front pillars of the motor vehicle and at least one air flow duct of plastics material for transporting air to the passenger compartment of the motor vehicle and having at least one segment disposed inside the metal structural element. According to the invention, the metal structural element comprises two assembled-together metal half-shells, and the air flow duct is independent of the two half-shells and has at least a fraction of its segment disposed inside the metal structural element subjected to elastic stress in at least one transverse direction, so that it is pressed at at least two opposite points against the inside face of the structural element under the action of the reaction force against said elastic stress.

7 Claims, 3 Drawing Sheets

DASHBOARD CROSS-MEMBER

The invention relates to a dashboard cross-member for a motor vehicle, and to a method of fabricating such a dashboard cross-member.

In particular, the invention relates to a motor vehicle dashboard cross-member comprising a tubular metal structural element assembled to the front body pillars of the motor vehicle, together with at least one air flow duct for transporting air to the passenger compartment of the motor vehicle and disposed at least in part inside the metal structural element.

BACKGROUND OF THE INVENTION

Such a cross-member has the advantage of locating the metal structural element of the vehicle and the air flow ducts concentrically, taking advantage of the tubular nature of the metal structural element. That leads to a saving in volume compared with a more conventional structure in which the structural element is disposed substantially parallel to, but not concentrically with the air flow ducts.

For reasons of heat losses due to the good thermal conductivity characteristics of steel, it is necessary to ensure that the air being transported does not come into direct contact with the tubular metal structural element, since otherwise the heating ventilation and air conditioning (HVAC) unit on board the vehicle would need to be over-dimensioned in order to accommodate said losses. It is therefore known to make the air flow duct out of a plastics material enabling the air it transports to be insulated from the steel of the cross-member.

U.S. Pat. No. 6,422,633 or DE 10 046 120 disclose motor vehicle dashboard cross-members each comprising a tubular metal structural element assembled to the front pillars of the motor vehicle and at least one air flow duct of plastics material for transporting air to the passenger compartment of the motor vehicle, which plastics duct is disposed at least in part inside the metal structural element. The fabrication methods envisaged in those documents rely on hybrid technologies in which the metal structure has elements of plastics material overmolded thereon to constitute in particular the air flow ducts. The plastics material elements also have a reinforcement function and contribute in part to the structural function of the cross-member. Such methods have the advantage of reducing the number of process steps and/or the number of intermediate products in the production cycle. However, that saving is achieved at the expense of a stage of developing the air flow cross-member and its associated tooling that is more complex, and thus leads to costs of fabricating and using the associated tools that are much greater than those conventionally associated with making a cross-member having parallel air flow ducts.

OBJECTS AND SUMMARY OF THE INVENTION

One of the objects of the present invention is to provide a method of fabricating a structural cross-member with a concentric plastics material air flow duct that makes it possible to achieve development costs and tooling costs that are comparable with the development and tooling costs for more conventional structures in which the metal structural element is disposed substantially parallel to but not concentrically with the plastics material air flow ducts, while nevertheless retaining the volume-saving advantages of the concentric structure.

To this end, the invention relates to a method of fabricating a dashboard cross-member for a motor vehicle, the cross-member comprising a tubular metal structural element assembled to the front pillars of the motor vehicle and at least one air flow duct of plastics material for transporting air to the passenger compartment of the motor vehicle and located at least in part inside the metal structural element.

According to the invention, the method comprises the following steps:

fabricating a bottom metal half-shell and a top metal half-shell complementary to the bottom metal half-shell and intended, once assembled together, to form the tubular metal structural element;

at the free ends of the bottom metal half-shell, assembling fastener means for fastening the tubular metal structural element with the front pillars;

fabricating the air flow duct out of plastics material; and sequentially positioning at least one air flow duct segment on one of the half-shells; and then assembling the top half-shell to the bottom half-shell, with the air flow duct segment being enclosed between the two half-shells.

The method of the invention goes away from the teaching of U.S. Pat. No. 6,422,633 or DE 10 046 120, by fabricating the metal structural elements and the air flow duct elements separately, and subsequently assembling together these previously-fabricated elements.

In one implementation of the step of assembling together the two half-shells, the top half-shell is adhesively bonded to the bottom half-shell.

In another implementation of the step of assembling together the two half-shells, the top half-shell is welded to the bottom half-shell.

In an implementation of the step of fabricating the air flow duct, the plastics material air flow duct is fabricated by an extrusion and blow-molding method.

In an implementation of the step of fabricating the air flow duct, the plastics material air flow duct is fabricated by an injection-molding method which comprises the following steps:

plastics material is injected into a mold having a mold cavity defining two half-shells interconnected by a film hinge;

unmolding the two half-shells interconnected by the film hinge; and assembling together the two half-shells made of plastics material by turning the two half-shells relative to each other about an axis passing via the film hinge, thereby producing the air flow duct made of plastics material.

In order to ensure cohesion between the metal structural element and the air flow duct, according to an optional characteristic of the invention, the air flow duct segment that is to be disposed inside the metal structural element comprises, prior to assembly of the metal half-shells and in at least one transverse direction, at least a portion presenting an outside dimension that is greater than the inside dimension of the facing metal structural element, such that during the step of assembling the two metal half-shells together, this portion is put into elastic compression in the transverse direction by the portions of the two assembled-together metal half-shells.

According to another optional characteristic of the invention, in order to ensure proper relative positioning of the elements that are to be assembled together, the metal structural element and the air flow duct segment that is to be disposed inside the metal structural element include complementary indexing means enabling the air flow duct to be positioned longitudinally and/or transversely and/or angularly relative to one of the metal half-shells and/or the metal structural element.

The invention also relates to a motor vehicle dashboard cross-member comprising a tubular metal structural element assembled to the front pillars of the motor vehicle and at least one plastics material air flow duct for transporting air towards the motor vehicle passenger compartment and having at least one segment disposed inside the metal structural element. According to the invention:

the metal structural element comprises two assembled-together metal half-shells; and the air flow duct is independent of the two half-shells and includes at least one segment portion disposed inside the metal structural element that is subjected to elastic stress in at least one transverse direction, and that is pressed against at least two opposite points of the inside face of the structural element under action of the reaction force to said elastic stress.

In an embodiment of the cross-member of the invention, the top half-shell is adhesively bonded to the bottom half-shell.

In an embodiment of the cross-member of the invention, the top half-shell is welded to the bottom half-shell.

In an embodiment of the cross-member of the invention, the air flow duct of plastics material is an extruded and blow-molded duct.

In an embodiment of the cross-member of the invention, the air flow duct of plastics material comprises two half-shells of plastics material interconnected by a film hinge integrally molded with said half-shells.

In an embodiment of the cross-member of the invention, the metal structural element and the air flow duct segment for placing inside the metal structural element include complementary indexing means enabling the air flow duct to be longitudinally and/or transversely and/or angularly positioned relative to one of the metal half-shells and/or to the metal structural element.

Finally, the invention also provides a motor vehicle including a structural body having two front pillars and a cross-member as defined above with fastener means that co-operate with complementary fastener means disposed on each of the front pillars in order to assemble the cross-member to the structural body of the vehicle between the two front pillars.

BRIEF DESCRIPTION OF THE DRAWINGS

The invention can be better understood on reading the following description given purely by way of example made with reference to the accompanying drawings, in which.

MORE DETAILED DESCRIPTION

Figure 1:
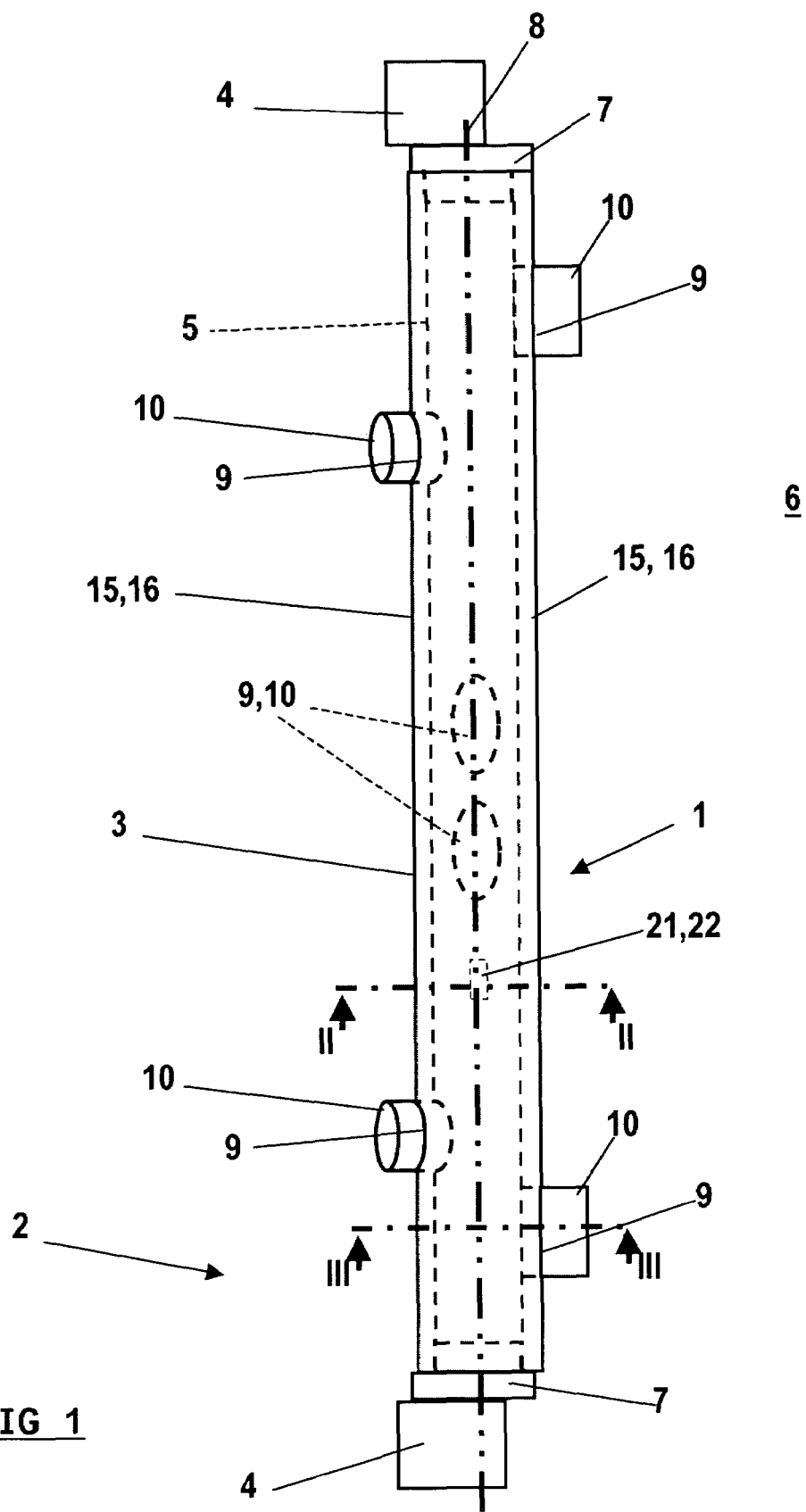
FIG. 1 is a fragmentary diagrammatic view of a vehicle in accordance with the present invention.

FIG. 1 is a fragmentary diagram of a motor vehicle 2 presenting a dashboard cross-member 1 comprising a tubular metal structural element 3 of longitudinal axis 8 assembled to the front body pillars 4 of the motor vehicle 2 and to at least one air flow duct 5 of plastics material for conveying air to the passenger compartment 6 of the motor vehicle 2, and disposed at least in part longitudinally inside the tubular metal structural element 3.

In the description below, the term "longitudinal" is used to mean any direction parallel to the axis 8 of the tubular metal structural element 3, and the term "transverse" or "cross" is used to designate any plane or direction perpendicular to the axis of the tubular metal structural element 3.

The dashboard cross-member 1 is connected to the front pillars 4 by any conventional fastener means 7 for fitting a cross-member to the front pillars of a motor vehicle, and by way of non-limiting example reference can be made to the fastener means proposed in French patent application FR-A-2 841 864.

The tubular metal structural element 3 presents at least one transverse opening 9 for passing a transverse outlet segment 10 of the air flow duct 5. This transverse outlet 10 may be connected to an air diffusion device (not shown) enabling the direction and/or the flow rate of air entering or leaving the air flow duct to be controlled. By way of example, this device may be a fan enabling air transported by the air flow duct 5 to be diffused into the passenger compartment 6, or it may be an air conditioner unit delivering a flow of air into the air flow duct 5.

The tubular metal structural element 3 of the invention comprises a bottom half-shell 11 and a top half-shell 12 assembled together along their longitudinal free edges 15 and 16. The means 7 for fastening the cross-member 1 to the front pillars 4 are assembled to the transverse ends of one or the other of the half-shells 11 and 12. Furthermore, and optionally, a metal strut (not shown) may be fitted to the metal structural element 3 to provide a rigid connection between the cross-member 1 and the floor of the vehicle 2 and/or a bottom metal windshield cross-member, thereby providing a rigid connection between the dashboard cross-member 1 and the bottom windshield cross-member (not shown) of the vehicle 2. The metal material constituting the two half-shells 11 and 12, the dimensions of each of the half-shells 11 and 12, and the method of assembling together the two half-shells 11 and 12, and also the means for fastening any metal strut and/or the metal bottom windshield cross-member with the cross-member 1 are all dimensioned so as to obtain a metal structural assembly satisfying the structural specifications for the dashboard cross-member 1. In other words, when assembled together, these two metal elements as mentioned above behave mechanically in such a manner as to comply with the crash strength requirements and the ability to withstand vibration that are set out by the specification for a dashboard provided with its equipment (airbags, steering column, instrument panel, HVAC, etc.) when mounted between the front pillars of a motor vehicle.

Figure 3:
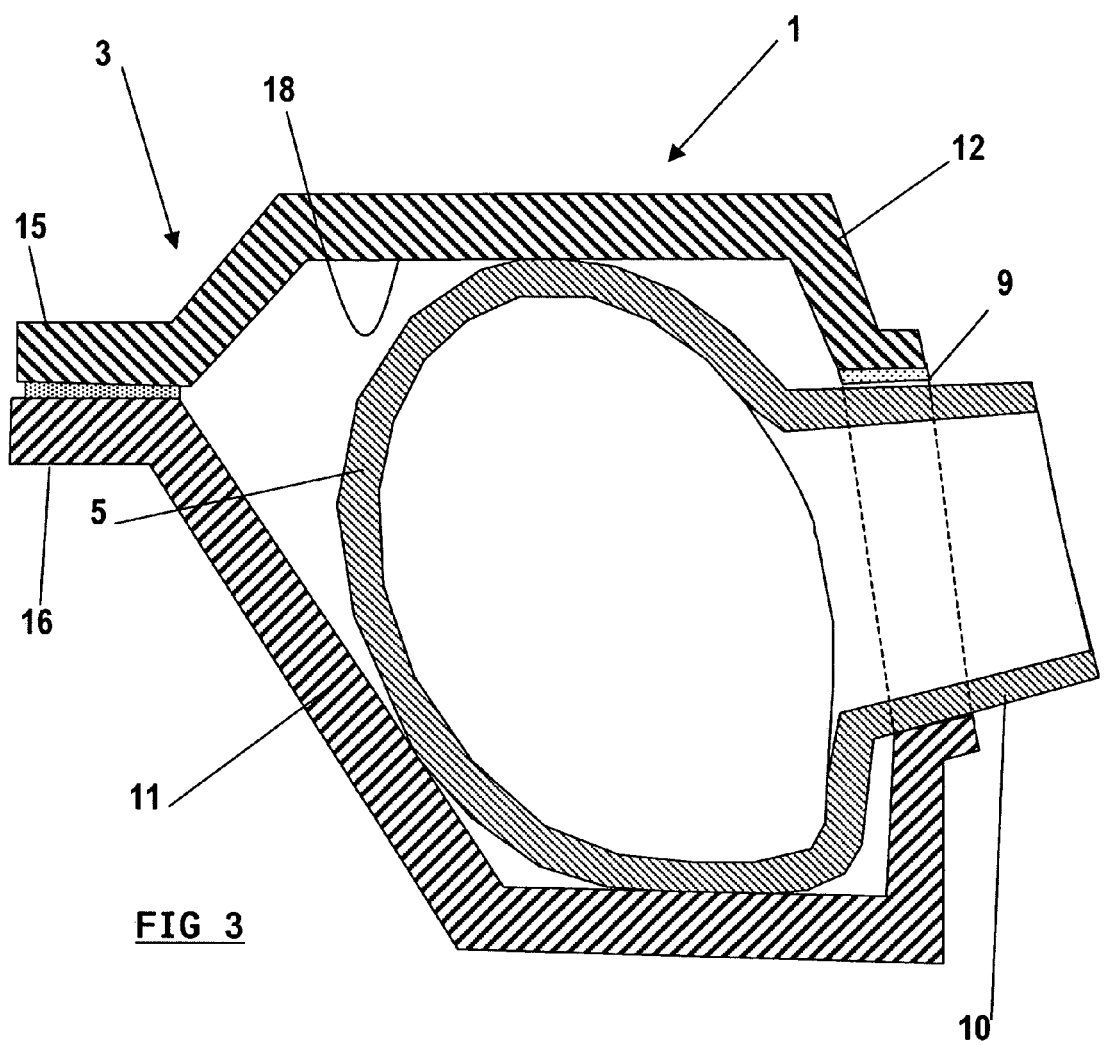
FIG. 3 is a diagrammatic cross-section view on line III-III of FIG. 1.

The longitudinal free edges of the two half-shells 11 and 12 are naturally optimized as a function of the positions of the transverse openings 9. In FIG. 3, the perimeter of the transverse opening 9 comprises a portion belonging to the top half-shell 12 and a portion belonging to the bottom half-shell 11.

Figure 2:
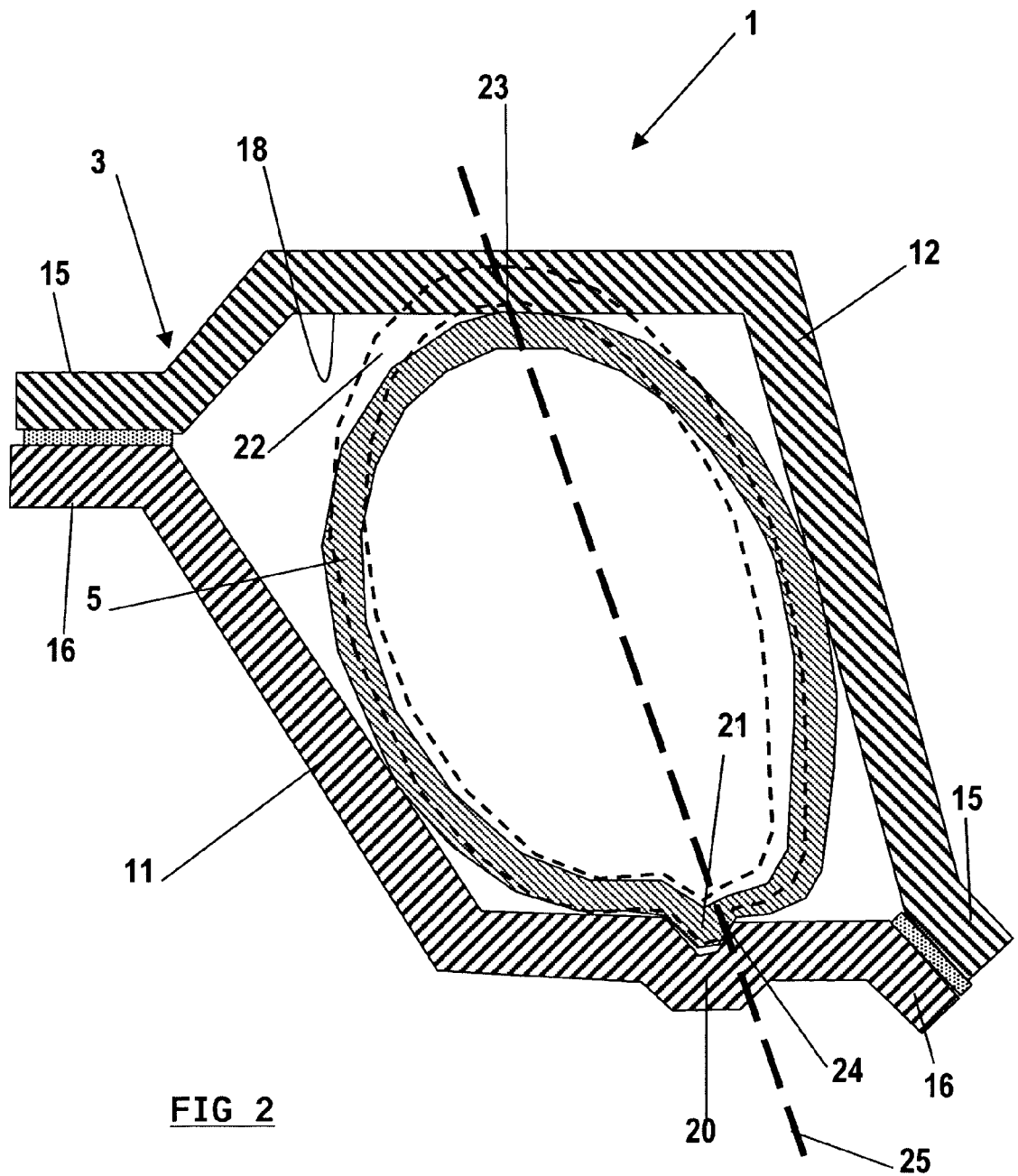
FIG. 2 is a diagrammatic cross-section view on line II-II of FIG. 1.

Methods of assembling together the two half-shells 11 and 12 may, for example, comprise adhesively bonding metal on metal (as shown in FIGS. 2 and 3), or else welding.

The air flow duct 5 is made of plastics material and comprises at least one longitudinal segment 5 disposed between the two half-shells 11 and 12. A method of making such an air flow duct 5 may be constituted, for example, by an extrusion and blow-molding method of known kind.

Another method of fabricating such an air flow duct comprises the following steps:

injecting plastics material into a mold having a mold cavity defining two half-shells 30 and 31 interconnected by a film hinge 32;

unmolding the two half-shells 30 and 31 united by the film hinge 32; and assembling together the two plastics half-shells 30 and 31 by turning the two half-shells 30 and 31 relative to each other about an axis passing via the film hinge 32, and uniting the longitudinal free edges 33 and 34 of the half-shells 30 and 31, thereby forming the air flow duct 5 made of plastics material.

Figure 4:
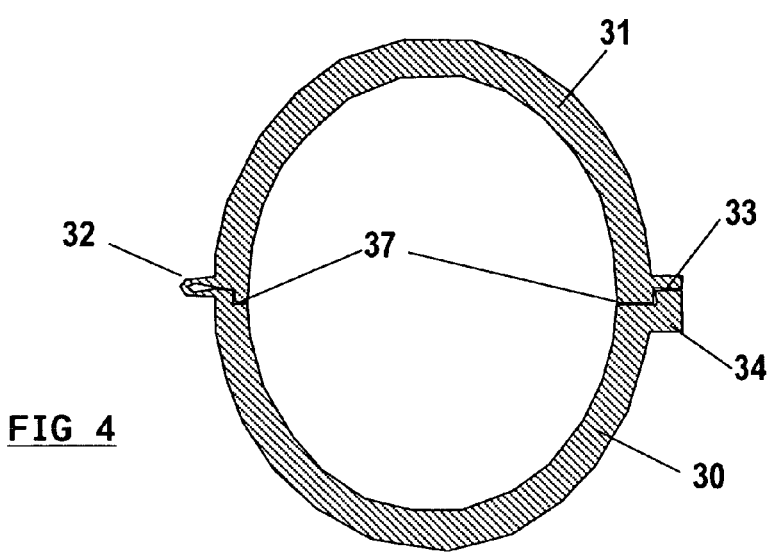
FIG. 4 is a diagrammatic cross-section view of a plastics air flow duct manufactured by a single-stage injection-molding process.

FIG. 4 is a diagrammatic cross-section of an air flow duct 5 made using this method. Advantageously, in order to provide good air tightness for the air flow duct made in this way, the longitudinal edges may present complementary staircase-shaped profiles so as to create a sealing baffle 37.

In order to position the air flow duct substantially between the two half-shells 11 and 12, the metal structural element 3 and the air flow duct segment 5 that is to be placed inside the metal structural element 3 have complementary indexing means 9, 10; 20, 21 enabling the air flow duct 5 to be positioned longitudinally and/or transversely and/or angularly relative to the bottom metal half-shell 11 and/or the top half-shell 12. The term "angular" positioning is used to mean the relative angular positioning of the duct 5 and the structural element 3 about the longitudinal axis 8 of the structural element 3.

The indexing means shown in FIGS. 1 and 2 include a groove element 20 provided in the bottom half-shell 11 and co-operating with a boss 21 formed on the air flow duct 5. When the air flow duct 5 is made by injection molding in a single step (see FIG. 4), the film hinge 32 or the free edges 33 and 34 may constitute bosses.

In addition, as shown in FIG. 3, a transverse opening 9 of the structural element 3 and the associated transverse outlet segment 10 of the air flow duct 5 together constitute indexing means.

According to another characteristic of the invention, prior to being assembled with the half-shells, the air flow duct 5 presents, in at least one transverse direction 25, an outside dimension that is greater than the corresponding inside dimension of the two assembled-together half-shells 11 and 12. This is represented in FIG. 2 where the dashed-line outline constitutes a cross-section 22 of the air flow duct 5 having the shape that it occupies immediately after being manufactured. When the two half-shells 11 and 12 are assembled to each other, the plastics material air flow duct 5 disposed between the half-shells 11 and 12 is subjected to deformation or elastic stress by virtue of the two half-shells 11 and 12 moving towards each other, thereby causing a return force to be generated that presses at least two opposite points 23 and 24 of the air flow duct 5 against the facing inside walls of the two half-shells 11 and 12. Thus, either alone or in combination with the indexing means, stressing the air flow duct 5 during the step of assembling together the two half-shells 11 and 12 ensures that the plastics material air flow duct 5 is held securely in place inside the metal structural element 3 without requiring any specific fastening technique such as overmolding, etc.

The method of fabricating such a dashboard cross-member 1 comprises the steps of:

fabricating the bottom metal half-shell 11 and the top metal half-shell 12 that is complementary to the bottom metal half-shell 11 and that, once assembled together, form the tubular metal structural element 3;

assembling the fastener means 7 of the tubular metal structural element 3 and the front pillars 4 at the free ends of the bottom or top metal half-shell 11 or 12;

fabricating the air flow duct 5 out of plastics material; and in sequence longitudinally positioning at least one segment of the air flow duct 5 on one of the half-shells 11, 12; and then assembling the top half-shell 12 to the bottom half-shell 11, with the air flow duct segment 5 being enclosed between the two half-shells 11 and 12.

What is claimed is:

1. A dashboard cross-member for a motor vehicle, the cross-member comprising a tubular metal structural element assembled to the front pillars of the motor vehicle, and at least one air flow duct of plastics material for transporting air to the passenger compartment of the motor vehicle and having at least one segment disposed inside the metal structural element, wherein:

the metal structural element has an inside face and is formed by a top half-shell and a bottom half-shell assembled together; and the at least one air flow duct is independent of the two half-shells and includes at least one portion of the segment disposed inside the metal structural element that is subjected to elastic stress in at least one transverse direction, and that is pressed against at least two opposite points of the inside face of the structural element under action of the reaction force to said elastic stress.

2. A motor vehicle dashboard cross-member according to claim 1, wherein the top half-shell is adhesively bonded to the bottom half-shell.

3. A motor vehicle dashboard cross-member according to claim 1, wherein the top half-shell is welded to the bottom half-shell.

4. A motor vehicle dashboard cross-member according to claim 1, wherein the at least one air flow duct of plastics material is an extruded and blow-molded duct.

5. A motor vehicle dashboard cross-member according to claim 1, wherein the at least one air flow duct of plastics material comprises two half-shells of plastics material interconnected by a film hinge integrally molded with said half-shells.

6. A motor vehicle dashboard cross-member according to claim 1, wherein the metal structural element and the at least one segment include complementary indexing means enabling the air flow duct to be positioned longitudinally, transversely and angularly relative to at least one of the metal half-shells and to the metal structural element.

7. A motor vehicle including a structural body having two front pillars and a motor vehicle dashboard cross-member according to claim 1, having fastener means co-operating with complementary fastener means disposed on each of the front pillars enabling the cross-member to be assembled to the structural body of the vehicle between the two front pillars.

* * * * *

UNITED STATES PATENT AND TRADEMARK OFFICE
CERTIFICATE OF CORRECTION

PATENT NO. : 7,296,848 B2  
APPLICATION NO. : 11/158626  
DATED : November 20, 2007  
INVENTOR(S) : Ivan Baudouin Page 1 of 1

It is certified that error appears in the above-identified patent and that said Letters Patent is hereby corrected as shown below:

On The Title Page, Item -57-
In the Abstract, replace with:

--The invention relates to a dashboard cross-member for a motor vehicle, the cross-member including a tubular metal structural element assembled to the front pillars of the motor vehicle and at least one air flow duct of plastics material for transporting air to the passenger compartment of the motor vehicle and having at least one segment disposed inside the metal structural element. The metal structural element includes two assembled-together metal half-shells, and the air flow duct is independent of the two half-shells and has at least a fraction of its segment disposed inside the metal structural element subjected to elastic stress in at least one transverse direction, so that it is pressed at at lest two opposite points against the inside face of the structural element under the action of the reaction force against the elastic stress.--

Signed and Sealed this

Fifteenth Day of April, 2008

JON W. DUDAS  
*Director of the United States Patent and Trademark Office*